United States Patent
Sugimoto

(10) Patent No.: US 6,897,850 B2
(45) Date of Patent: May 24, 2005

(54) INFORMATION PROCESSING APPARATUS AND INFORMATION OUTPUT CONTROLLING METHOD

(75) Inventor: Koichi Sugimoto, Saitama (JP)

(73) Assignee: Sony Corporation, Tokyo (JP)

( * ) Notice: Subject to any disclaimer, the term of this patent is extended or adjusted under 35 U.S.C. 154(b) by 684 days.

(21) Appl. No.: 09/885,224

(22) Filed: Jun. 20, 2001

(65) Prior Publication Data

US 2002/0018027 A1 Feb. 14, 2002

(30) Foreign Application Priority Data

Jun. 22, 2000 (JP) .................................... P2000-187081
May 30, 2001 (JP) .................................... P2001-161713

(51) Int. Cl.$^7$ ............................ G09B 5/00; G10L 15/26; G10L 13/08
(52) U.S. Cl. ........................ 345/169; 345/901; 434/317; 704/235; 704/260
(58) Field of Search ................................ 345/169, 901; 434/317; 704/235, 260

(56) References Cited

U.S. PATENT DOCUMENTS

| | | | | |
|---|---|---|---|---|
| 5,534,888 A | * | 7/1996 | Lebby et al. | ................. 345/672 |
| 5,710,576 A | * | 1/1998 | Nishiyama et al. | ......... 345/169 |
| 5,847,698 A | * | 12/1998 | Reavey et al. | .............. 345/173 |
| 5,859,594 A | * | 1/1999 | King et al. | ................. 340/7.55 |
| 5,874,947 A | * | 2/1999 | Lin | ............................ 345/169 |
| 5,898,600 A | * | 4/1999 | Isashi | ......................... 708/105 |
| 5,954,514 A | * | 9/1999 | Haas et al. | ................. 434/317 |
| 5,991,594 A | * | 11/1999 | Froeber et al. | ............. 434/317 |
| 6,064,855 A | * | 5/2000 | Ho | ............................. 434/317 |
| 6,313,828 B1 | * | 11/2001 | Chombo | ..................... 345/169 |
| 2001/0043194 A1 | * | 11/2001 | Amron | ....................... 345/169 |

* cited by examiner

*Primary Examiner*—Xiao Wu
*Assistant Examiner*—M. Fatahiyar
(74) *Attorney, Agent, or Firm*—Jay H. Maioli

(57) ABSTRACT

An information processing apparatus wherein playback of display data and playback of audio data relating to the display data are changed over in an associated relationship with each other in response to an open or closed state of a lid mounted on a housing, includes the portable housing having an image display section provided thereon, the lid mounted for opening and closing motion on the housing for covering the display section, a lid opening/closing detection section for detecting opening or closing of the lid with respect to the housing, a display control section for displaying display data on the image display section, an audio playback section for playing back audio data relating to the display data, and a control section for controlling the audio playback section so as to play back, when opening or closing of the lid is detected by the opening/closing detection section, the audio data relating to the display data displayed when the opening or closing of the lid is detected by the lid opening/closing detection section.

17 Claims, 14 Drawing Sheets

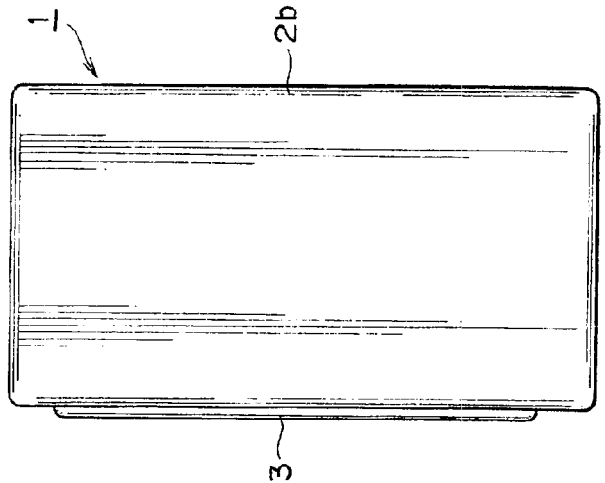
PRIOR ART
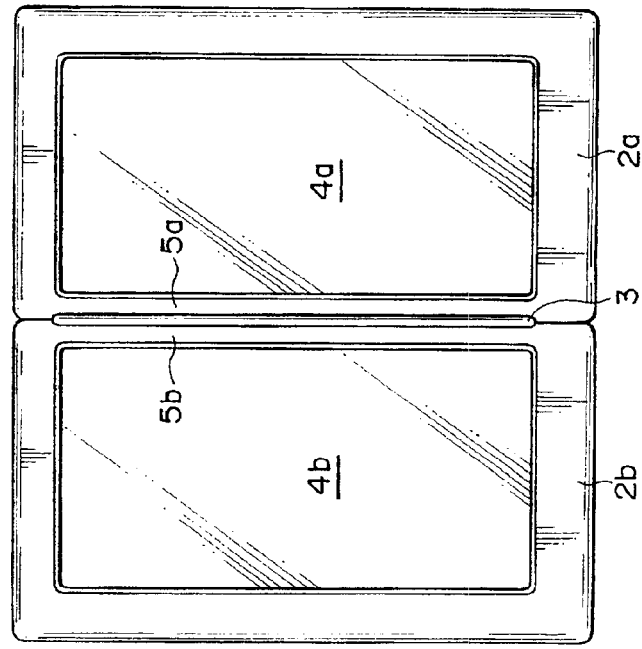

F I G. 3
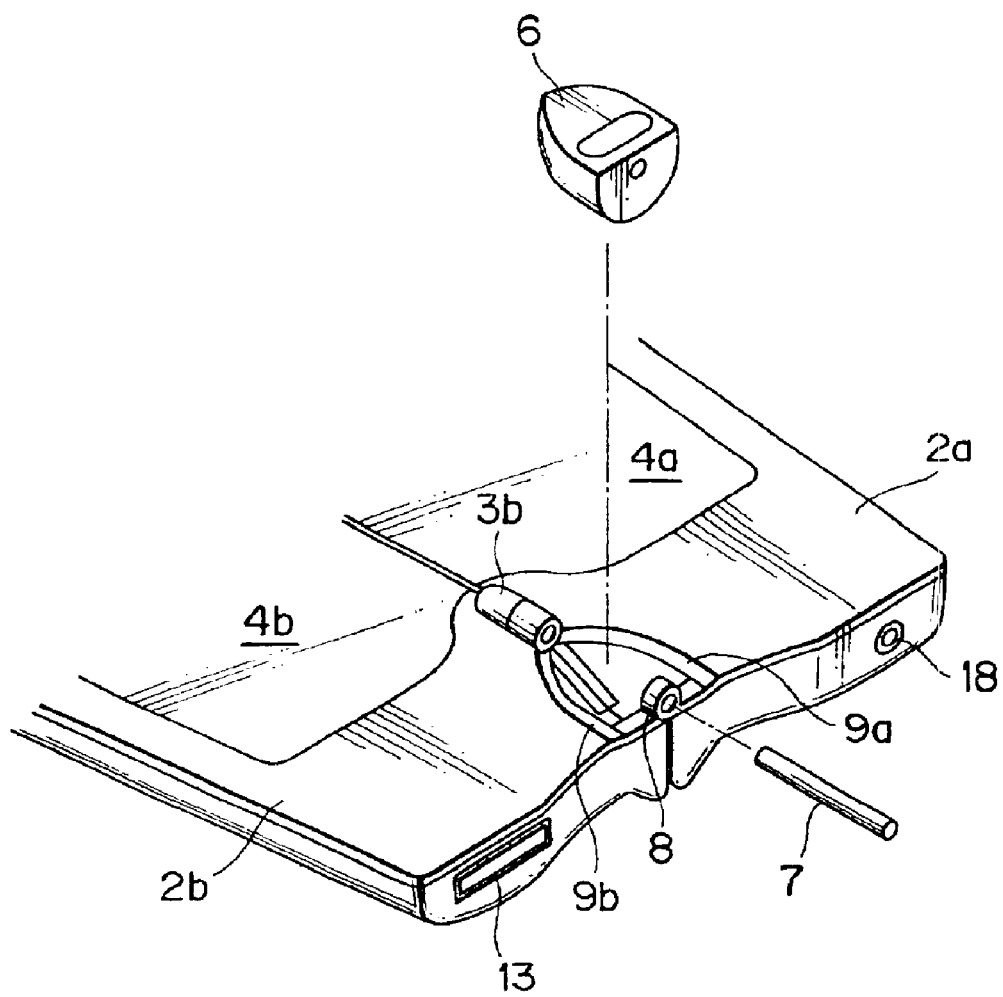

F I G. 12
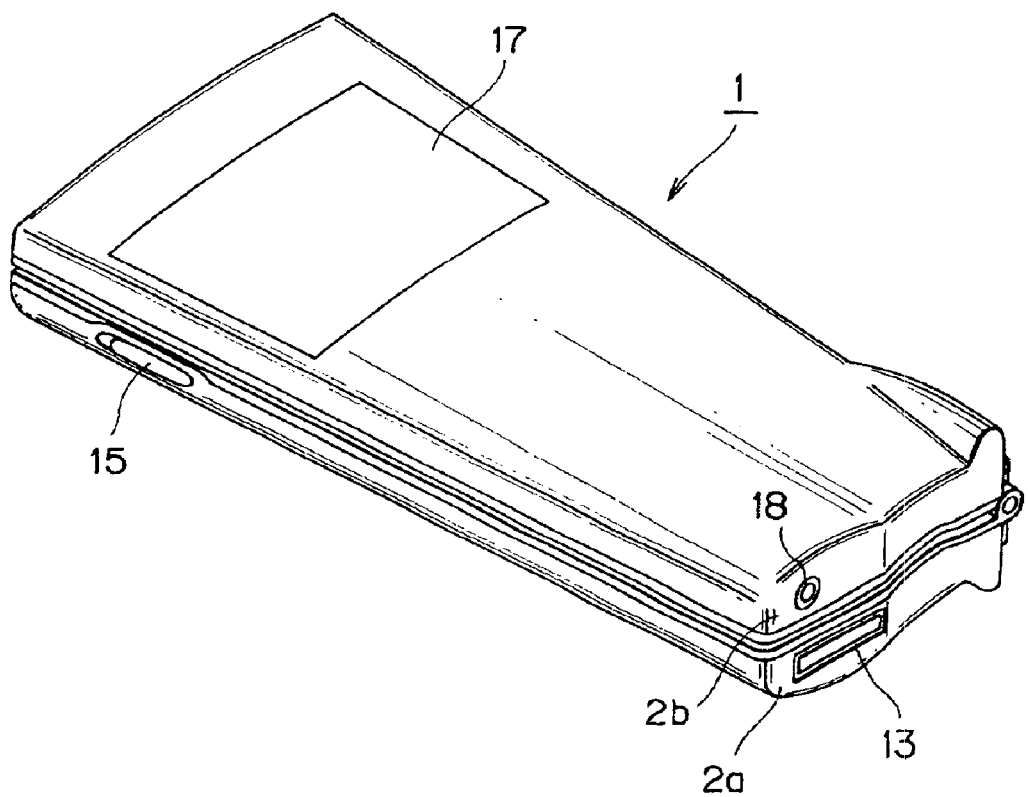

INFORMATION PROCESSING APPARATUS AND INFORMATION OUTPUT CONTROLLING METHOD

BACKGROUND OF THE INVENTION

This invention relates to an information processing apparatus and an information output controlling method wherein display data and audio data relating to the display data are switchably played back in an associated relationship from each other in response to opening/closing of a lid with respect to a housing.

If someone wants to read a book of a novel or the like, for example, in an electric train, the book will be carried in a bag or the like and opened in an electric train with one hand while the pages are turned with the other hand. However, if the electric train is crowded, then the operation of turning the pages may not be performed.

Thus, an information processing apparatus has been developed wherein the pages can be displayed successively without an operation for turning the pages. A structure of a conventional information processing apparatus of the type mentioned is shown in FIGS. 1A, 1B and 1C. Referring to FIGS. 1A to 1C, the conventional information processing apparatus 1 shown includes a pair of bodies 2a and 2b coupled for pivotal motion relative to each other by a hinge 3 so that they can be pivotally opened and closed relative to each other. A pair of magnets not shown are provided at locations of the bodies 2a and 2b remote from the hinge 3 so that the closed state of the information processing apparatus 1 may be kept by a magnetic force acting between the magnets. A pair of display sections 4a and 4b are provided at opposing faces of the bodies 2a and 2b, respectively.

When the information processing apparatus 1 is open as seen in FIG. 1C, characters can be displayed on the display sections 4a and 4b in a similar manner as in a case wherein a book is open, and if a switch not shown is operated, then new pages can be successively displayed on the display sections 4a and 4b in a similar manner as in a case wherein the pages are turned.

However, the conventional information processing apparatus 1 is disadvantageous in that, if mere reading of characters thereon is continued for a long time, then this strains the eyes.

SUMMARY OF THE INVENTION

It is an object of the present invention to provide an information processing apparatus and an information output controlling method wherein reproduction of display data and reproduction of audio data relating to the display data are changed over in an associated relationship with each other in response to an open or closed state of a lid with respect to a housing.

In order to attain the object described above, according to an aspect of the present invention, there is provided an information processing apparatus, including a portable housing having an image display section provided thereon, a lid mounted for opening and closing motion on the housing for covering the display section, opening/closing detection means for detecting opening or closing of the lid with respect to the housing, display control means for displaying display data on the image display section, audio reproducing means for reproducing audio data relating to the display data, and control means for controlling the audio reproducing means so as to reproduce, when opening or closing of the lid is detected by the opening/closing detection means, the audio data relating to the display data displayed when the opening or closing of the lid is detected by the opening/closing detection means.

According to another aspect of the present invention, there is provided an information processing apparatus, including a portable housing having an image display section provided thereon, a lid mounted for opening and closing motion on the housing for covering the display section, display data storage means for storing display data, audio data storage means for storing audio data, opening/closing detection means for detecting opening or closing of the lid with respect to the housing, display control means for displaying the display data from the display data storage means on the image display section, audio reproducing means for reproducing the audio data from the audio storage means, and control means for controlling the display data reproducing means so that the reproduction of the display data reproducing means is stopped when closing of the lid with respect to the housing is detected by the opening/closing detection means while the display control means displays the display data on the image display section and controlling the audio reproducing means so that the audio data relating to the display data displayed by the display control means when closing of the lid is detected are reproduced from the audio storage means.

According to a further aspect of the present invention, there is provided a controlling method of controlling outputting, from an information processing apparatus which includes a portable housing having an image display section provided thereon and a lid mounted for opening and closing motion on the housing for covering the display section, display data to be displayed on the image display section and audio data relating to the display data, including the steps of successively displaying the display data on the image display section in response to an operation of a user, detecting that the lid for the housing is operated while the display data are displayed, searching for the audio data relating to the display data displayed on the image display section when it is detected that the lid is operated, and successively reproducing the audio data from the searched out audio data.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 1A and 1B are a top plan view and a front elevational view, respectively, of a conventional information processing apparatus in a closed state, and FIG. 1C is a schematic view of the conventional information processing apparatus in an open state;

FIG. 3 is a fragmentary perspective view of a feed switch of the information processing apparatus of FIGS. 2A to 2D;

FIG. 12 is a perspective view showing the information processing apparatus of FIGS. 2A to 2D in a closed state;

DETAILED DESCRIPTION OF THE PREFERRED EMBODIMENTS

Figure 2A:
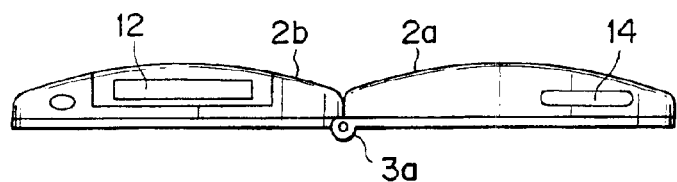
FIGS. 2A, 2B, 2C and 2D are a top plan view, a front elevational view, a bottom plan view and a left-hand side elevational view, respectively, of an information processing apparatus to which the present invention is applied.
Figure 2D:
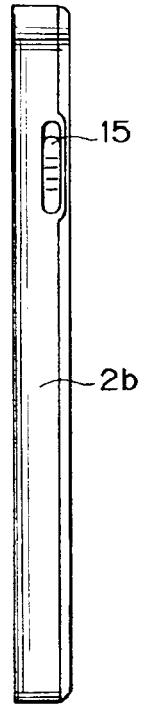
Figure 2B:
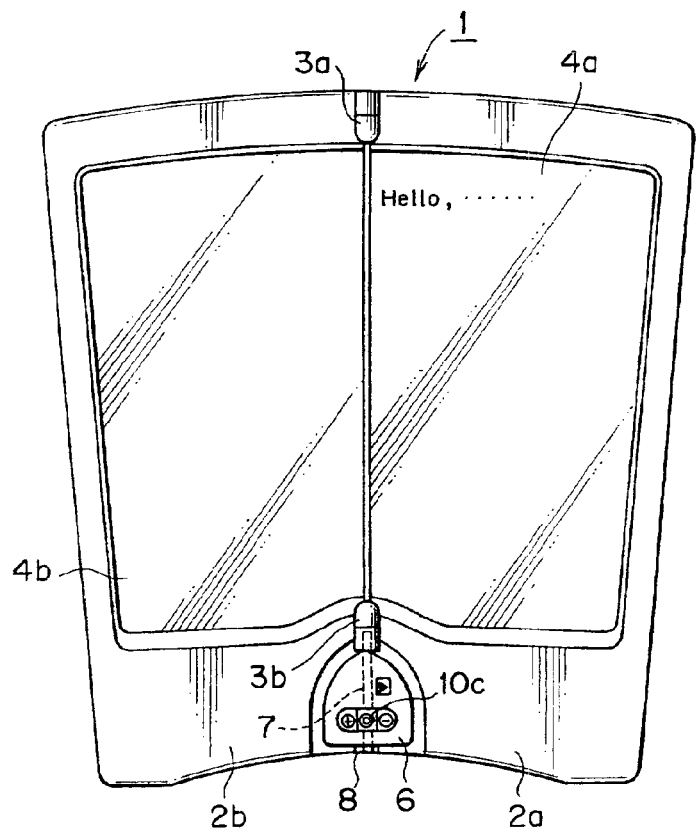

Referring to FIGS. 2A to 2D, there is shown an information processing apparatus to which the present invention is applied. The information processing apparatus shown is generally denoted at 1 and includes a pair of bodies 2a and 2b each having an inverted trapezoidal shape in front elevation as seen in FIG. 2B. A pair of display sections 4a and 4b each serving as a display section are provided on opposing faces of the bodies 2a and 2b, respectively. The bodies 2a and 2b are connected for pivotal motion relative to each other by a pair of hinges 3a and 3b. The hinges 3a and 3b are provided separately from each other at upper and lower ends of the bodies 2a and 2b on the opposite sides of the display sections 4a and 4b. Consequently, no hinge is positioned between the display sections 4a and 4b so that the pair of display sections 4a and 4b may look as if they were contiguous to each other. Since no hinge is present between the display sections 4a and 4b, adjacent ends of the display sections 4a and 4b oppose each other directly such that the display sections 4a and 4b look like a single display unit.

The information processing apparatus 1 includes an audio outputting section 51 (refer to FIG. 8) for outputting an audio signal corresponding to characters displayed on the display sections 4a and 4b. Software for both of text data and audio data is used as software for a book selected, and the data are each divided into a plurality of block data and the blocks of mutually relating contents are linked to each other.

A pair of magnets not shown for keeping the information processing apparatus 1 in a closed state are provided on the faces of the bodies 2a and 2b on which the display sections 4a and 4b are provided. Further, the information processing apparatus 1 includes a lid opening/closing detection section 54 shown in FIG. 8 which may include an on-off switch or the like for detecting that the information processing apparatus 1 is open or closed.

If the bodies 2a and 2b are pivotally opened, then the lid opening/closing detection section 54 detects this based on a signal inputted from the on-off switch or the like and enables the display sections 4a and 4b. Meanwhile, the audio outputting section 51 is enabled either when the lid opening/closing detection section 54 detects that the information processing apparatus 1 is closed from its open state or when the closed state is detected and an output switch 19 (refer to FIG. 6 or 7) is switched on, depending upon setting between the two requirements.

In order to allow the information processing apparatus 1 to read a book aloud in response to an operation of the output switch 19 while the information processing apparatus 1 remains in a closed state, the title of the book must be displayed on the outer side of the information processing apparatus 1. To this end, a sub display section 17 is provided on an outer face of the body 2b as seen in FIG. 12.

Figure 4A:
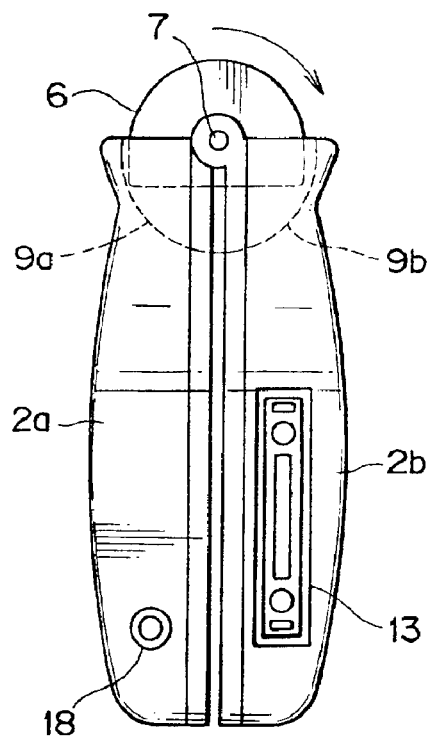
FIGS. 4A and 4B are bottom plan views particularly showing the feed switch of the information processing apparatus of FIGS. 2A to 2D.
Figure 4B:
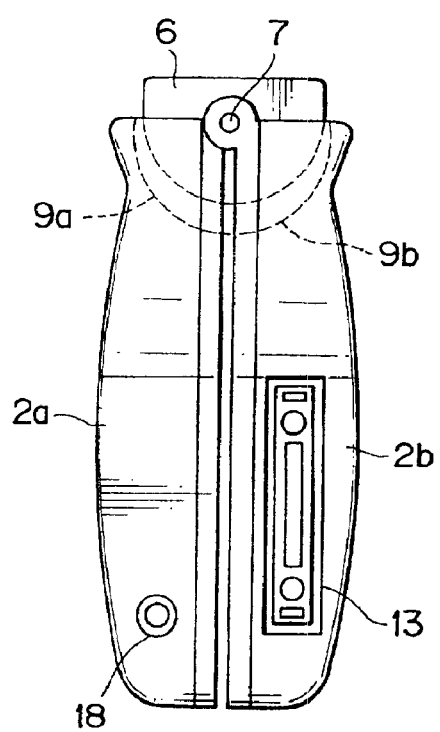
Figure 5:
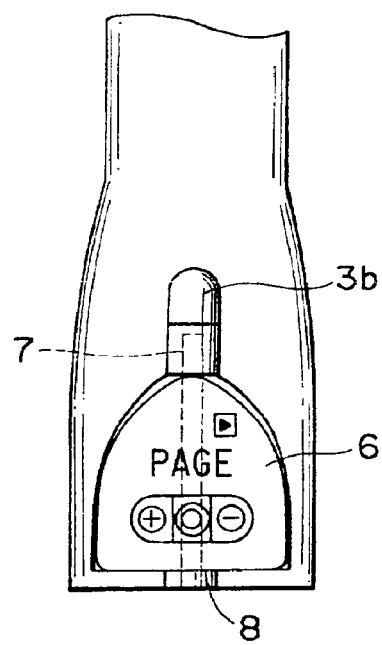
FIG. 5 is a schematic view showing the feed switch of FIG. 3 directed to the outside of the information processing apparatus of FIGS. 2A to 2D.

A feed switch 6 of the seesaw type integrated with a hinge is provided as an operation section for operating the screens displayed on the display sections 4a and 4b to turn or feed the pages forwardly or backwardly. In particular, referring to FIG. 3, the feed switch 6 is supported for turning motion on a shaft 7 for the hinge 3b. More particularly, a bearing 8 in the form of a ring is securely mounted at a lower end of the body 2a, and the shaft 7 extends between the bearing 8 and the hinge 3b. A pair of recesses 9a and 9b are formed in the bodies 2a and 2b by cutting away portions of the bodies 2a and 2b around the shaft 7, respectively. As can be seen from FIGS. 4A and 4B, the recesses 9a and 9b extend from the display faces to end faces of the bodies 2a and 2b, respectively. The recesses 9a and 9b are cut away such that they have a radial dimension which increases downwardly of the information processing apparatus 1 along an axial direction of the shaft 7 but have an equal dimension in a circumferential direction along the axial direction of the shaft 7. The feed switch 6 is accommodated in the recesses 9a and 9b and supported for turning motion on the shaft 7. The feed switch 6 can be turned by 180 degrees in the recesses 9a and 9b. If the feed switch 6 is turned by 180 degrees in a state of FIG. 4A wherein the information processing apparatus 1 is closed, then the feed switch 6 is exposed to the outside as seen in FIGS. 4B and 5. Consequently, the feed switch 6 can be operated in the state wherein the information processing apparatus 1 is closed.

Figure 6:
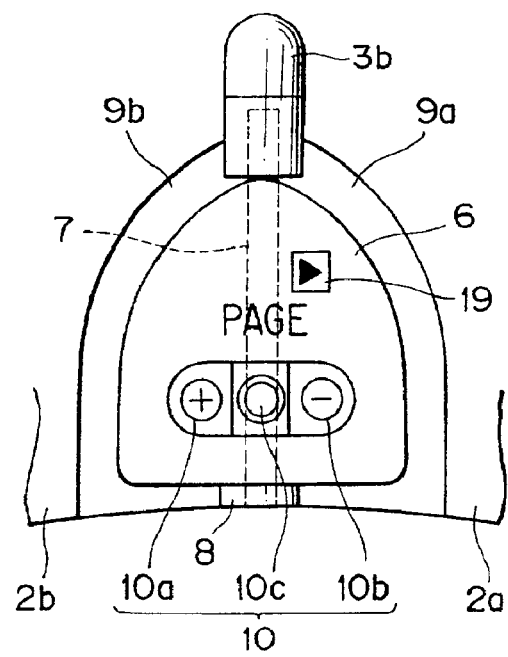
FIG. 6 is a schematic view showing the feed switch of FIG. 5 more particularly.

The feed switch 6 has such a surface as shown in FIG. 6. Referring to FIG. 6, the feed switch 6 has a seesaw section 10 having a feeding portion 10a and a returning portion 10b. Each time the feeding portion 10a is depressed, the numbers of the pages displayed on the display sections 4a and 4b are incremented, but each time the returning portion 10b is depressed, the numbers of the pages displayed on the display sections 4a and 4b are decremented.

The seesaw section 10 has a starting instruction operation element 10c which serves as a start/stop button for performing "starting of reading aloud" and "stopping of reading aloud".

Since the feed switch 6 is supported for turning motion, the feed switch 6 and the bodies 2a and 2b have such a structure that a flexible wiring line is threaded in the inside of the hinge 3b or the hinge 3b itself has a structure like a rotary switch.

Figure 7:
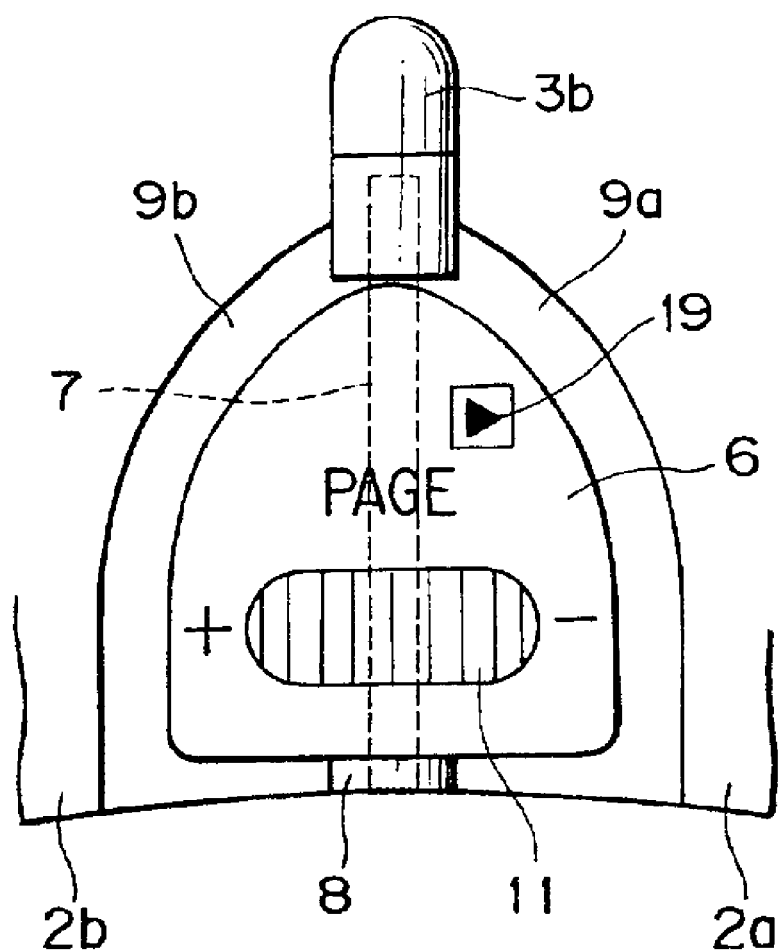
FIG. 7 is a similar view but showing another form of the feed switch of the information processing apparatus of FIGS. 2A to 2D.

The feed switch 6 may otherwise be of such an operation dial type as shown in FIG. 7. Referring to FIG. 7, the feed switch 6 includes an operation dial 11 mounted for turning motion thereon. If the operation dial 11 is turned leftwardly in FIG. 7, then the numbers of the pages displayed are incremented, but if the operation dial 11 is turned rightwardly in FIG. 7, then the numbers of the pages displayed are decremented. However, if the operation dial 11 is depressed entirely, then it acts similarly to the starting instruction operation element 10c of FIG. 6.

The feed switch 6 may alternatively be of the roller type or the like.

Figure 8:
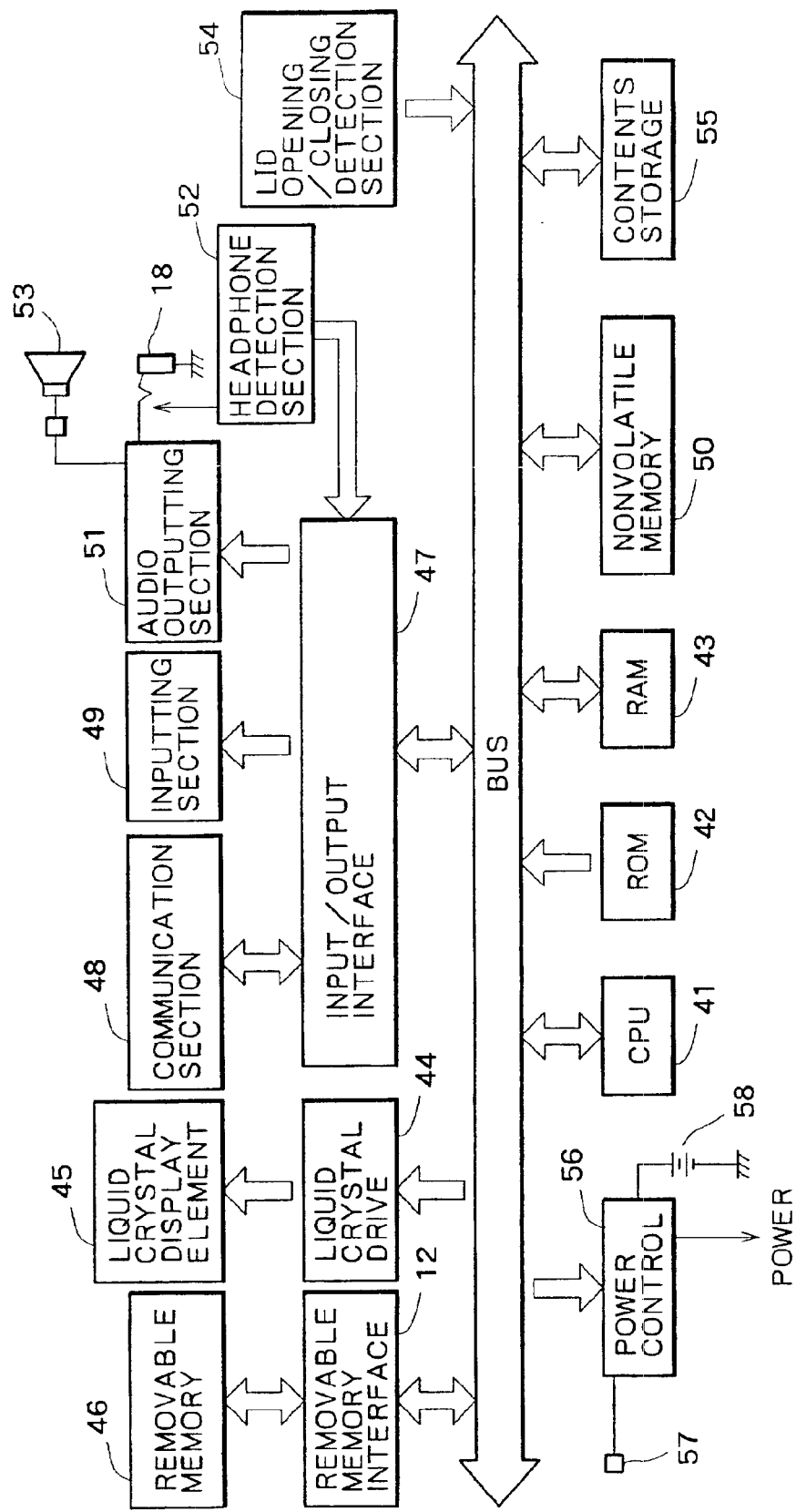
FIG. 8 is a block diagram showing an embodiment of electric configuration of the information processing apparatus of FIGS. 2A to 2D.

The information processing apparatus 1 further has such an electric configuration as shown in FIG. 8. Referring to FIG. 8, the information processing apparatus 1 includes a central processing unit (CPU) 41, a read only memory (ROM) 42 and a random access memory (RAM) 43 built therein.

A nonvolatile memory 50 stores various preset values and such data and so forth that must be kept stored even when power supply to the information processing apparatus 1 is switched off during operation. The nonvolatile memory 50 may be formed from, for example, a flash memory or a RAM which is backed up by a battery.

A contents storage 55 is a storage medium for holding contents in the information processing apparatus 1 so that the contents can be played back even if a removable memory 46 is not loaded in a removable memory interface or slot 12. The contents storage 55 may be formed from, for example, a nonvolatile memory, a magnetic disk represented by a hard disk, a magneto-optical disk or the like.

The audio outputting section 51 outputs audio data relating to contents displayed in the form of an image, in this instance, particularly read aloud audio data of a book or the like, to a speaker 53 or a headphone connected to a headphone output terminal 18. If it is detected by a headphone detection section 52 that a headphone is connected to the headphone output terminal 18, then the audio outputting section 51 is controlled by an input/output interface 47 so that a playback audio signal may not be outputted to the speaker 53. Further, when contents are set in advance so that they are inhibited from being outputted to the speaker 53 or when it is set by the user that any contents are inhibited from being outputted to the speaker 53, the audio outputting section 51 is controlled by the input/output interface 47 so that audio playback from the speaker 53 is inhibited irrespective of a result of the detection of the headphone detection section 52. It is to be noted that the audio outputting section 51 may be controlled otherwise through the input/output interface 47 by the CPU 41.

Figure 2C:
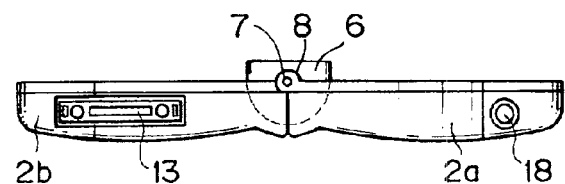

A liquid crystal display element 45 represents the display sections 4a and 4b and the sub display section 17 described hereinabove, and the removable memory slot 12 (refer to FIG. 2A) for receiving a removable memory 46 as a recording medium in which contents software for displaying characters on the display sections 4a and 4b and the sub display section 17 is stored is provided on the upper face of the body 2b. The removable memory 46 may be, for example, a memory stick or smart media which is a kind of flash memory card, an SD card, a compact flash card, a PC card memory (all trademarks) or the like. Further, the removable memory 46 may be a storage medium which includes a disk medium or the like of a small size and has a profile substantially same as those of the memories listed above. In order to download or receive contents software not from the removable memory 46 but from a personal computer or the like, a connection terminal 13 serving as a communication section 48 of FIG. 8 is provided on the bottom face of the body 2b (refer to FIG. 2C). Contents received from the removable memory 46 loaded in the removable memory interface 12 and/or downloaded from an external apparatus through the communication section 48 are stored into the contents storage 55 and used later. Contents downloaded from an external apparatus through the communication section 48 may otherwise be stored into the removable memory 46 loaded in the removable memory interface 12 and used later. A battery 58 is built in the body 2a or 2b, and the connection terminal 13 serves also as a connection terminal for charging the battery 18. A function switch 14 (refer to FIG. 2A) serving as an inputting section 49 of FIG. 8 for setting the font, size and so forth of characters to be displayed on the display sections 4a and 4b is provided on the top face of the body 2a. The function switch 14 is of the seesaw type and can vary the settings by depressing a left or right portion of the function switch 14. A power switch 15 is provided on a side face of the body 2b as shown in FIG. 2D, and the headphone output terminal 18 is provided on the bottom face of the body 2a as shown in FIG. 2C. Further, the operation elements 10a, 10b and 10c and the output switch 19 shown in FIG. 6 are provided as the inputting section 49.

The internal battery 58 and an external power supply connection terminal 57 are connected to a power control 56 so that stabilized power is supplied to the internal elements of the information processing apparatus 1. Where a predetermined voltage and current are supplied from the external power supply connection terminal 57, the power control 56 supplies, when a power supply switch of the information processing apparatus 1 is on, stabilized power to the internal elements of the information processing apparatus 1 and charges the internal battery 58 with the power supply. On the other hand, when predetermined power is supplied through the external power supply connection terminal 57 but the power supply switch of the information processing apparatus 1 is off, the power control 56 controls so that the internal battery 58 is charged. However, charging of the power control 56 is performed only while the internal battery 58 has a charged amount with which charging is required. When the predetermined power is not supplied to the external power supply connection terminal 57, if the power supply switch of the information processing apparatus 1 is on, then the power control 56 produces predetermined power required by the individual elements of the information processing apparatus 1 from the internal battery 58 and supplies the power to the elements. Even if the power supply switch of the information processing apparatus 1 is off, when the remaining charge amount of the internal battery 58 is higher than a predetermined level, the power control 56 supplies power, with which the block of the CPU 41 can operate, to the CPU 41. This is because, even when the power supply to the information processing apparatus 1 is off, the CPU 41 must perform supervision to switch on the power supply of the information processing apparatus 1 when a user operates the power supply switch. Further, the power control 56 performs starting and stopping of supply of power to the information processing apparatus 1 in accordance with a power supply on/off signal from the CPU 41.

Now, operation of the information processing apparatus 1 described above is described with reference to flow charts of FIGS. 9 and 10 and diagrams of a data arrangement map in a contents file of FIGS. 11A and 11B. It is to be noted that numbers at lower portions of FIG. 9 and numbers at upper portions of FIG. 10 indicate that the same numbers are connected to each other.

Figures 11A, 11B:
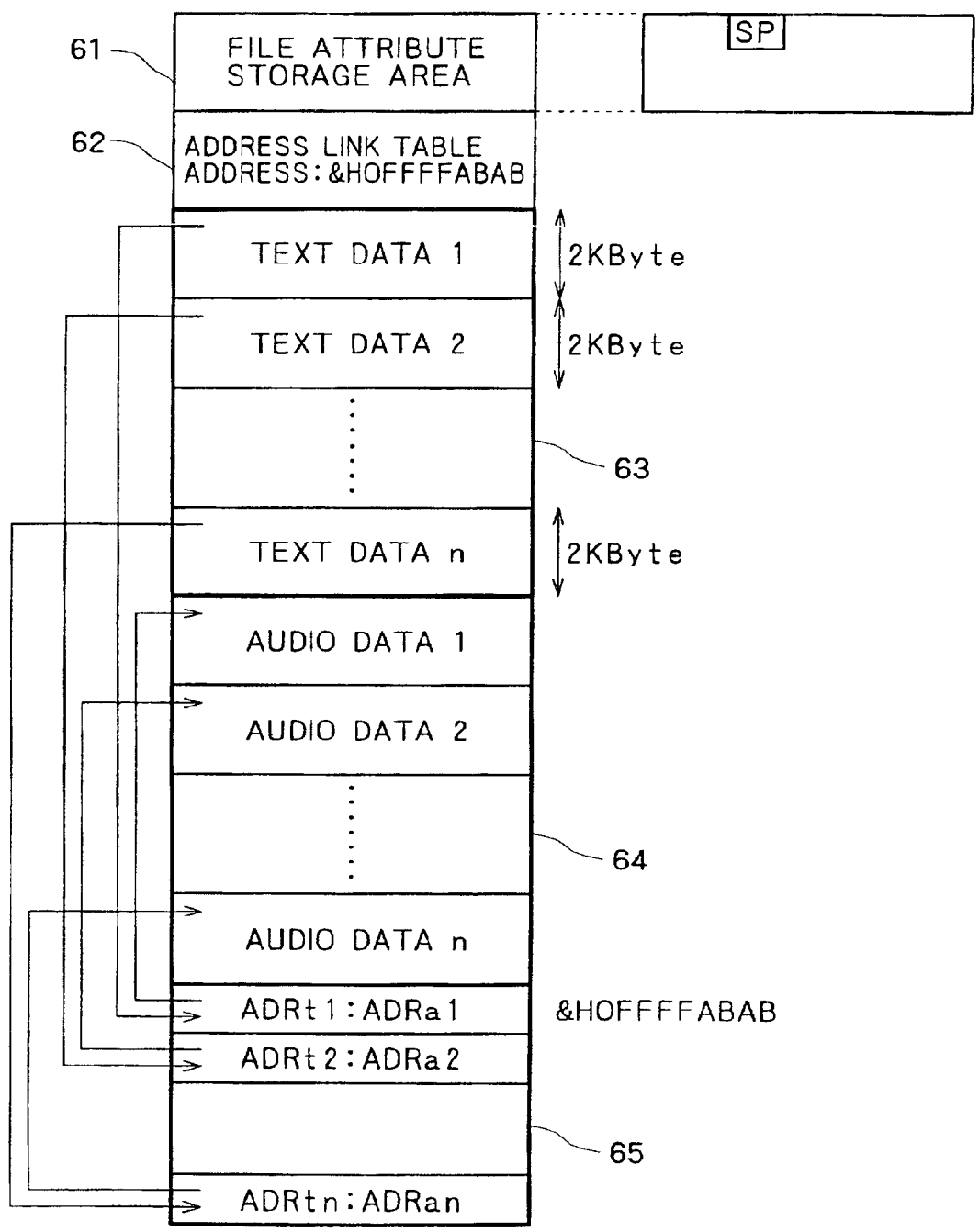
FIGS. 11A and 11B are diagrammatic views illustrating a data arrangement map of a contents file used in the information processing apparatus of FIGS. 2A to 2D.

First, the data arrangement map of the contents file of FIGS. 11A and 11B is described. Referring first to FIG. 11A, the contents file illustrated includes a file attribute storage area 61, an address link table address 62, a text block 63, an audio block 64, and an address link table 65.

The text block 63 stores text data divided in blocks for each predetermined recording capacity unit. The audio block 64 stores audio data in blocks which are associated with the text data. The relationship between the text data and the audio data is provided as link information in the address link table 65. Further, the address link table address 62 stores index data which indicates at which portion of the contents file the address link table 65 is stored. The file attribute storage area 61 stores data which define attributes of the entire contents file.

The text data of the text block 63 are divided in sub blocks of, for example, 2 kbytes and thus stored as text data 1, text data 2, . . . , and text data n. The unit of the division is not necessarily limited to 2 kbytes but the text data may be divided as variable length data such as a chapter or a paragraph of writing.

The audio data stored in the audio block 64 are stored in blocks as audio data 1, audio data 2, . . . , and audio data n which are associated with the text data 1, 2, . . . , and n, respectively, and are, for example, voice data when text data are read aloud. The sound data may be, for example, a linear PCM (Pulse Code Modulation) audio signal or a compression audio file of the ADPCM (Adaptive Differential Pulse Code Modulation), the ATRAC (Advanced TRansform Acoustic Coding) which is a registered trademark of the assignee of the present invention or the MP3 (MPEG Audio Layer 3).

The address link table 65 stores link information indicative of a relationship in which the text data and the audio data are linked to each other. For example, in the first data ADRt1:ADRa1 of address link information of the address link table 65, the top address of a sub block in which the text data 1 are recorded and the top address of another sub block in which the audio data 1 are recorded are recorded in a predetermined format. Accessing to the address link table 65 makes it possible to search for a relationship between text data and audio data from any of the text data and the audio data. In order to allow such a search, the address link table address 62 is provided to detect the address link table 65 from the contents file. In the example illustrated in FIG. 11A, the address link table address 62 stores the address &H0FFFFABAB, and the address link table 65 is stored in address beginning with the address &H0FFFFABAB of the contents file.

The file attribute storage area 61 stores speaker output permission information SP as seen in FIG. 11B, a text block address indicative of the top address of the text block 63 in which text data are stored, an audio block address indicative of the top address of the audio block 64 in which audio data are stored, and other necessary information. The top address of each of the text data 1 to n can be determined by tracing the text data based on the text block address. Further, the top address of each of the audio data 1 to n can be determined by tracing the audio data based on the audio block address.

Figure 13:
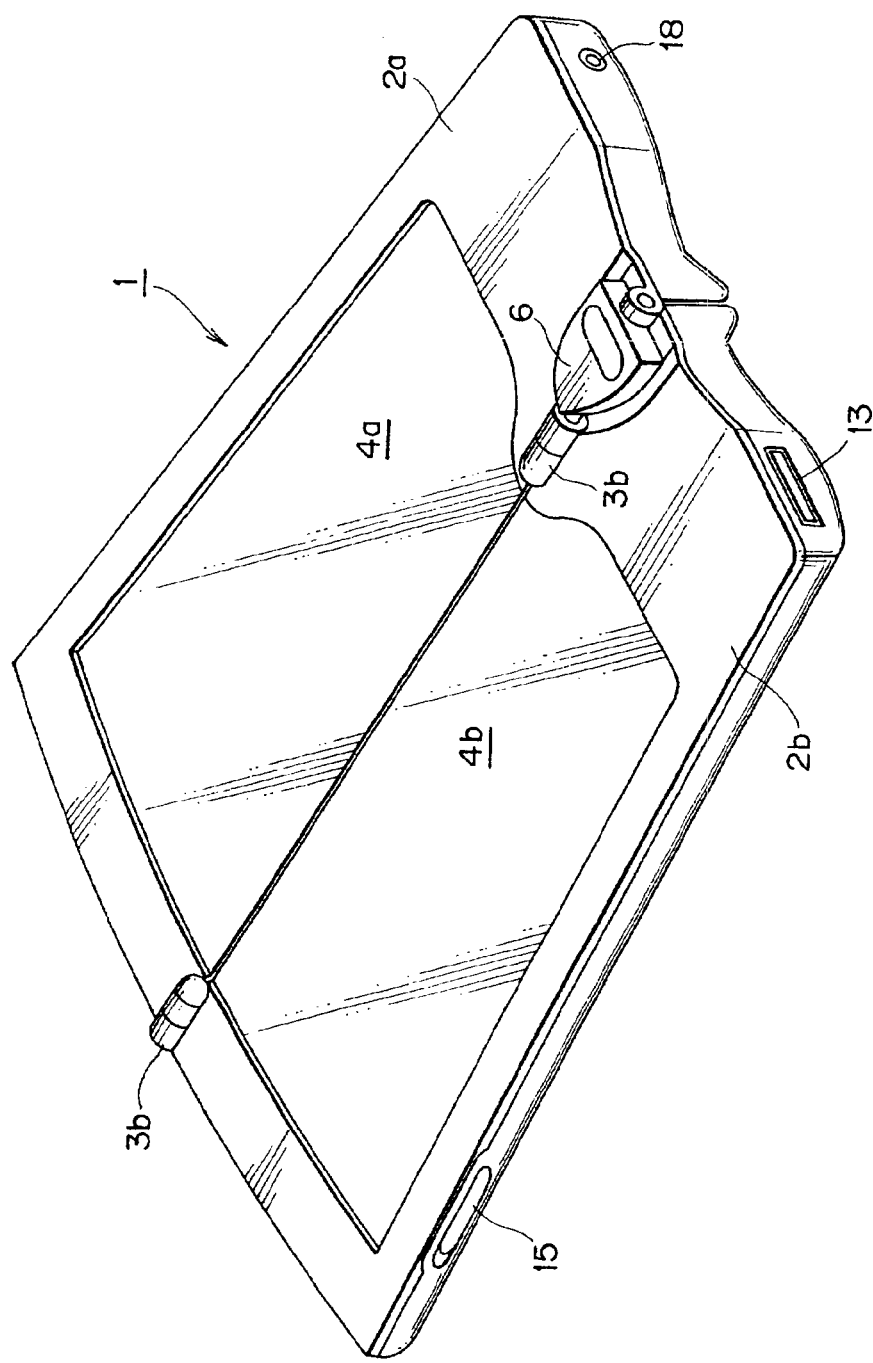
FIG. 13 is a perspective view showing the information processing apparatus of FIGS. 2A to 2D in an open state.

When the information processing apparatus 1 is to be used, while it is in a closed state as seen in FIG. 12, a memory stick as the removable memory 46 may be inserted into the removable memory interface 12 called MS slot. Then, the power switch 15 will be switched on. Consequently, a routine RT1 begins to operate, and in step SP1, initialization of the RAM 43 and various initial settings are performed. If it is intended to change the initial settings, then the display of an item to be set is reversed using the function switch 14 after the set contents are displayed. Thereafter, the information processing apparatus 1 will be opened as seen in FIG. 13. Thereupon, an on-state of the on-off switch not shown is detected in step SP2 which is a detection processing step. Then in step SP3, an initial screen is displayed on each of the display sections 4a and 4b, and the titles of books are displayed in a list on the initial screen. Thus, the user will operate the function switch 14 to select the title of the book which the user wants to read in step SP4. Consequently, contents which the user wants to play back are selected.

Then in step SP5, it is detected whether or not a page read last is recorded depending upon the presence or absence of a resume flag in the nonvolatile memory 50. If the resume flag is not detected in the nonvolatile memory 50, then the top text block address is loaded in step SP6, and the text block address is loaded from the nonvolatile memory 50 provided as a resume RAM in step SP7, whereafter the text block data of the top page or the page read last are loaded in step SP8. It is to be noted that, as the resume RAM, a region of the RAM 43 of FIG. 8 which is backed up by a battery or the like may be used. Alternatively, a predetermined region of the removable memory 46 may be used, or else the contents storage 55 may be used. The text loaded from the contents storage 55 based on the text block address loaded from the nonvolatile memory 50 is displayed on the display sections 4a and 4b serving as a main display section in step SP9.

If the displayed text is read fully, then the user will depress the feeding portion 10a of the feed switch 6 once. In this instance, for example, if the text is read while the user carries the information processing apparatus 1 on the palm of the left hand, then since the thumb of the left hand holds a portion of the body 2b in the proximity of the feed switch 6, the feed switch 6 can be depressed readily by displacing the position of the thumb. In other words, the pages can be turned while the information processing apparatus 1 is carried on the left hand without using the right hand, and this makes it possible for the user to read a book in such a situation that the user is in a very crowded electric train and cannot move an inch. When the feeding portion 10a is depressed, the next pages are displayed on the display sections 4a and 4b, and reading of the book can be proceeded successively by repeating the operation described above. In addition, the page can be returned to the previous page by depressing the returning portion 10b.

If it is detected in step SP10 that the bodies 2a and 2b of the information processing apparatus 1 are not closed but remain open, then various settings are performed in step SP12, whereafter the processing advances to step SP8. Thus, the processing in steps SP8 to SP12 is repeated in accordance with a request of the user to repeat displaying of the pages requested by the user.

Then, if the user is tired in reading and closes the information processing apparatus 1, then it is detected in step SP10 of the detection processing step that the information processing apparatus 1 is closed. If it is detected in step SP10 that the information processing apparatus 1 is closed, then in step SP14 of a starting instruction processing step, predetermined mode setting data is read out from the nonvolatile memory 50 to discriminate whether or not the information processing apparatus 1 is set in a read mode. If it is discriminated that the information processing apparatus 1 is set in the read mode, then a text block address corresponding to the text displayed immediately before the information processing apparatus 1 is closed is confirmed in step SP15. Further in step SP16, an audio block address linked to the text block address confirmed in step SP15 is calculated. The calculation of the audio block address linked to the text block address is performed based on the address link information stored in the address link table 65. Then in step SP17 of an auxiliary display processing step, the display sections 4a and 4b are switched off while the sub display section 17 is switched on. In this instance, the title of the contents currently selected or the like is displayed on the sub display section 17. Further, the CPU 41 controls to stop supply of power from the power control 56 to the display sections 4a and 4b, which corresponds to the liquid crystal display element 45 shown in FIG. 8, and a liquid crystal drive 44 so as to suppress power consumption.

In step SP18, a read flag indicative of a reading aloud play state or a pause state stored in the nonvolatile memory 50 is set to a pause state. In next step SP19 of an output processing step, it is discriminated whether or not the start-stop button 10c of FIG. 6 is depressed. If it is discriminated that the start-stop button 10c is depressed, then it is discriminated in step SP20 whether or not the reading aloud state flag at the point of time is the pause state. If it is discriminated in step SP20 that the reading aloud state flag at the point of time is the pause state, then the processing advances to step SP21, in which audio block data whose audio block address has been determined and which is an object of reading are loaded from the contents storage 55 and the audio block address is updated so as to indicate the address of audio block data to be read subsequently. In next step SP22, reading aloud of the audio block data read out in step SP21 is started, and in step SP23, the reading aloud state flag stored in the nonvolatile memory 50 is set to the play state. On the other hand, if it is discriminated in step SP20 that the reading aloud state flag is the play state when the starting instruction operation element 10c is depressed, then the processing advances to step SP24, in which the reading aloud is stopped. Each time the starting instruction operation element 10c is depressed, the reading aloud state flag changes over alternately between the play state and the pause state. If a terminal of a headphone is inserted into the headphone output terminal 18 while audio block data are played back, the user can listen to the read contents through the headphone. If it is discriminated in step SP19 that the starting instruction operation element 10c is not depressed, then various settings are performed in step SP36, whereafter the processing returns to step SP19 so that the processing described above is repeated.

If it is detected in step SP26 that the information processing apparatus 1 is opened, then the audio block address corresponding to the audio block data played back immediately before the information processing apparatus 1 is opened is determined in step SP27, and the text block address indicative of the recorded location of the text block data linked to the determined audio block address is calculated. The calculation of the address is performed by reference to the address link table 65 described hereinabove. Thereafter, the processing returns to step SP8, in which the text block data are loaded based on the calculated text block address. Then in step SP9, contents of the text are displayed on the display sections 4a and 4b again and the mode changes over from the reading aloud mode to the display mode.

Figure 9:
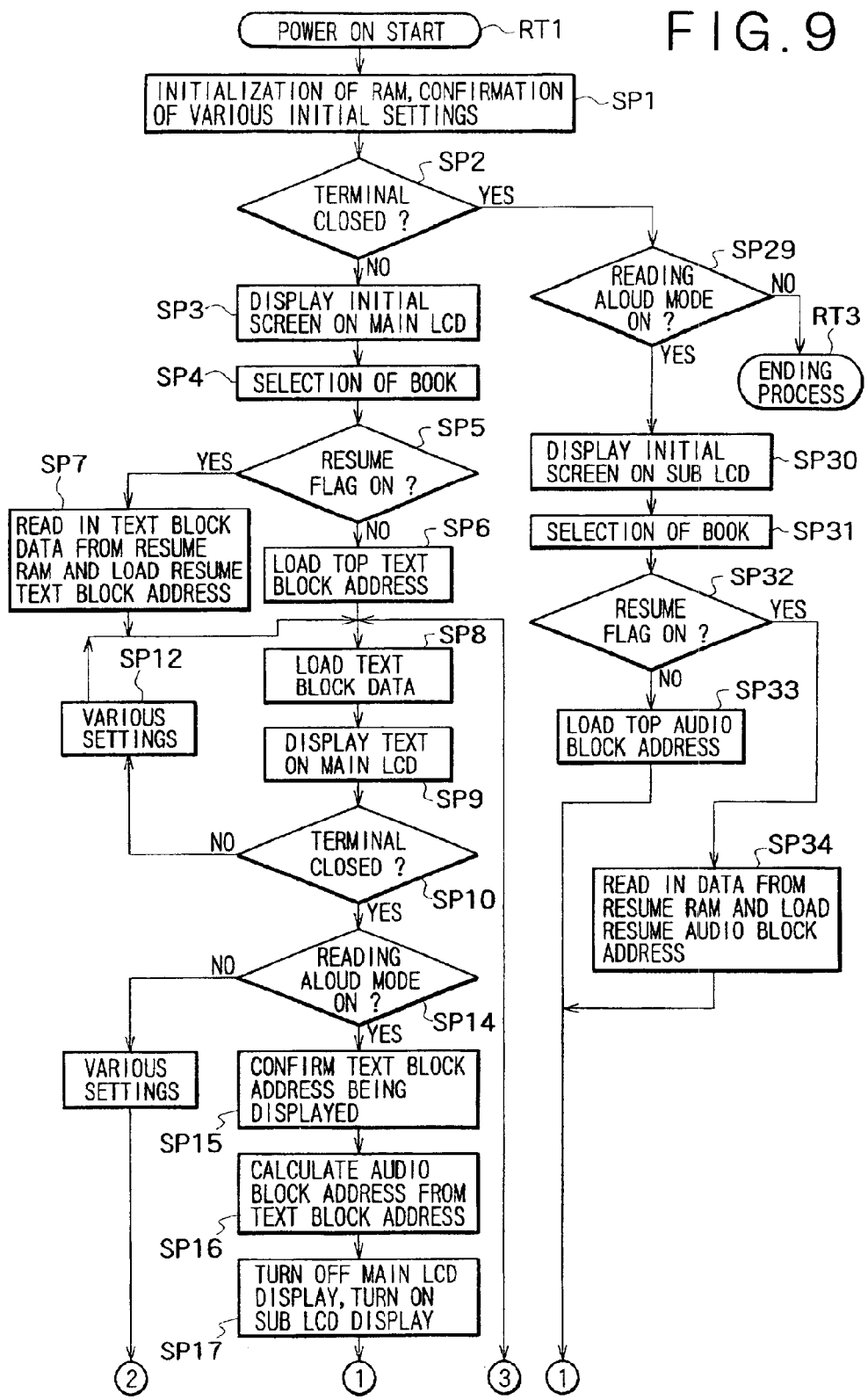
FIGS. 9 and 10 are flow charts illustrating operation of the information processing apparatus of FIGS. 2A to 2D.
Figure 10:
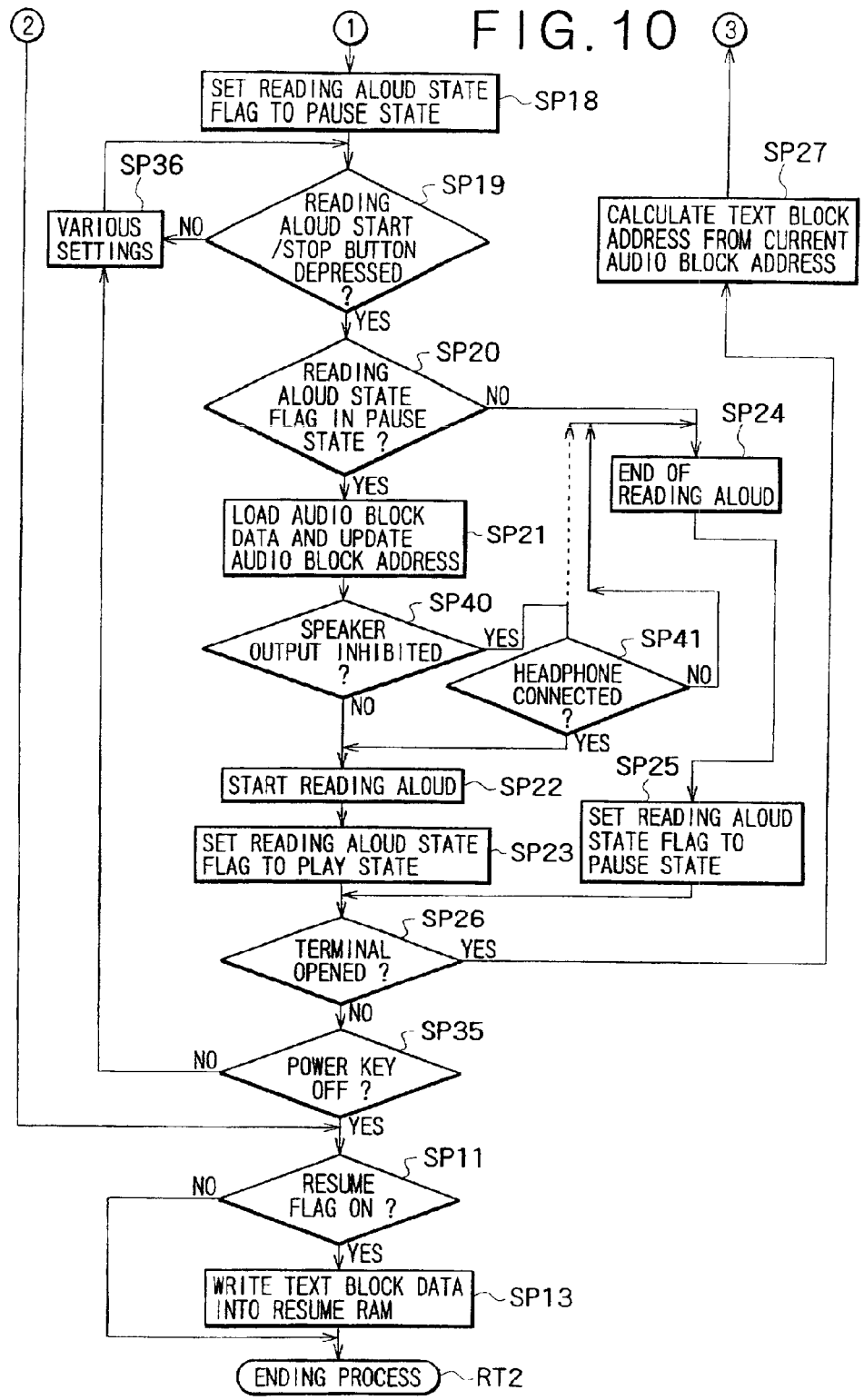

On the other hand, before the power switch 15 is off by depressing it, if it is discriminated in step SP2 of the detection processing step in FIG. 9 that the information processing apparatus 1 is in the closed state, then the processing advances to step SP29. In step SP29 of the starting instruction processing step, it is discriminated whether or not the reading aloud mode is on. In this instance, the reading aloud mode can be discriminated depending upon whether or not the output switch 19 of FIG. 6 is depressed. If it is discriminated in step S29 that the reading aloud mode is not on, then the processing advances to a routine RT3, in which an ending processing is performed. If it is discriminated in step S29 that the reading aloud mode is on as a result depression of the output switch 19, then the processing advances to step SP30. In step SP30 of an auxiliary display processing step, an initial screen is displayed on the sub display section 17. Then, after selection of a book is performed in step Sp31, it is discriminated in step SP32 from on/off of the resume flag stored in the nonvolatile memory 50 whether or not a page read in the last reading is recorded. If the resume flag is on and accordingly resume playback is set, then the processing advances to step SP34, in which an audio block address indicating audio block data stored in the nonvolatile memory 50 with which resume playback is to be started is read out. On the other hand, if it is discriminated in step SP32 that the resume flag is off, i.e. resume playback is not set, then the audio block address indicative of the position at which audio block data of the block as the selected contents is loaded in step SP33. After the audio block address is loaded in step SP33 or SP34, the processing advances to step SP18 described hereinabove. It is to be noted that, in step SP34, the audio block address with which resume playback is to be started may not be loaded directly from the nonvolatile memory 50, but otherwise the text data address with which resume playback is to be started may be stored in the nonvolatile memory 50 and the audio block address may be calculated based on the read out data address with reference to the address link table 65.

If it is detected in step SP35 that the power switch 15 is off while the information processing apparatus 1 is in the reading aloud mode and in a closed state, then the processing advances to step SP11 for a power supply switching off process of the information processing apparatus 1. If an off-state of the power switch 15 is not detected in step SP35, then the processing advances to step SP36 for various settings. Then, after such various settings are performed in step SP36, the processing returns to step SP19. If the power switch 15 is switched off in step SP35, it is discriminated in step SP11 whether or not the resume flag is on. The resume flag is stored in the nonvolatile memory 50. If the resume flag is on and consequently playback is to be resumed then, then the playback is started from a position next to the text block data or the audio block data which has been played back immediately before the power supply switching off process by the power switch 15 is performed. If the resume playback is set in step SP11, then the text block address which is an address of the text block data which is required upon resumption of playback is recorded into the nonvolatile memory 50 as the resume RAM in step SP13 of a storage processing step. Thereafter, the processing advances to step RT2 so that a power supply switching off process may be executed. On the other hand, if the resume playback is not set in step SP11, then the processing advances to step RT2 so that the power supply switching off process is executed.

It is to be noted that, if the text block loaded in step SP13 of the storage processing step is an intermediate block of the contents, then the text block data currently loaded may be recorded into the nonvolatile memory 50. This makes it possible, for example, when the startup time of the contents storage 55 is long, to read out and display the text block data stored in the nonvolatile memory 50 in advance and make use of the time within which the user reads as a time within which the contents storage 55 is to be started up. On the other hand, if the text block loaded in step SP13 is the last block of the contents, then since storage of the text data into the nonvolatile memory 50 is not necessary, such storage process is omitted.

The contents playback properties stored in such a file attribute storage area 61 which can be provided for each of contents as described above sometimes has speaker playback inhibition information SP set therein.

Where the speaker playback inhibition information SP is set, even if the information processing apparatus 1 is set to the reading aloud mode, outputting of played back audio data from the speaker 53 mounted on the information processing apparatus 1 is disabled. More specifically, if step SP40 is provided next to step SP21 in FIG. 10, then it is discriminated in step SP40 whether or not the speaker playback inhibition information SP of the contents playback properties of the file attribute storage area 61 is set. If the discrimination reveals that playback by speaker outputting is not inhibited, then the processing advances to step SP22, in which reading aloud is started to perform audio data playback.

If it is discriminated in step SP40 that playback by a speaker is inhibited, then the processing advances to step SP24, in which the reading aloud routine is ended.

Consequently, played back audio data of contents are prevented from being heard, for example, by a person around the user. In this manner, the secrecy is improved.

On the other hand, where the headphone detection section 52 can detect whether or not a headphone is connected to the information processing apparatus 1, step SP41 may be processed subsequently to step SP21. If it is detected in step SP41 that a headphone is connected to the headphone output terminal 18, then the processing advances to step SP22, in which reading aloud is started. On the other hand, if it is discriminated in step SP41 by the headphone detection section 52 that a headphone is not connected to the headphone output terminal 18, then the processing advances to step SP24, in which a reading aloud ending process is performed. Where step SP41 described above is provided, if the information processing apparatus 1 does not otherwise include the speaker 53, then if reading aloud is started while no headphone is connected to the information processing apparatus 1 because of an erroneous operation of the user or the like, then the playback position of text data advances while the user does not recognize it and unnecessary power is consumed, which may result in consumption of the battery while the user does not recognize it. This disadvantage can be prevented by preventing reading aloud from being started unless a headphone is connected to the headphone output terminal 18 of the information processing apparatus 1 by the user as described above.

Further, the information processing apparatus 1 may operate such that step SP40 is processed subsequently to step SP21 and, when outputting of played back audio data from a speaker is inhibited in step SP40, a connection state of a headphone is discriminated in step SP41 and it is determined based on a result of the discrimination in step SP41 whether the processing should advance to step SP22 or step SP24. In this instance, it is detected in step SP40 that speaker outputting is inhibited, and if it is discriminated in step SP41 that a headphone is not connected to the information processing apparatus 1, then the processing advances to step SP24, in which a reading aloud ending process can be performed. In this instance, if it is discriminated in step SP41 conversely that a headphone is connected, then even if playback outputting from a speaker is inhibited, the user can hear played back audio data from the headphone conveniently.

Further, when the processing advances to step SP24 as a result of the discrimination in step SP40 or step SP41, the processing further advances through step SP25 to step SP26, in which it is discriminated whether or not the information processing apparatus 1 is opened, and then to step SP35, in which it is discriminated whether or not the power key is operated. However, the operations in steps SP26 and SP35 may be replaced by the following operation. In particular, after the reading aloud state flag is set to the pause state in step SP25, the power control 56 is controlled so that the power supply to the information processing apparatus 1 may be switched off. By the control, unnecessary power consumption of the internal battery 58 can be suppressed, which is preferable to the portable apparatus.

Figure 14:
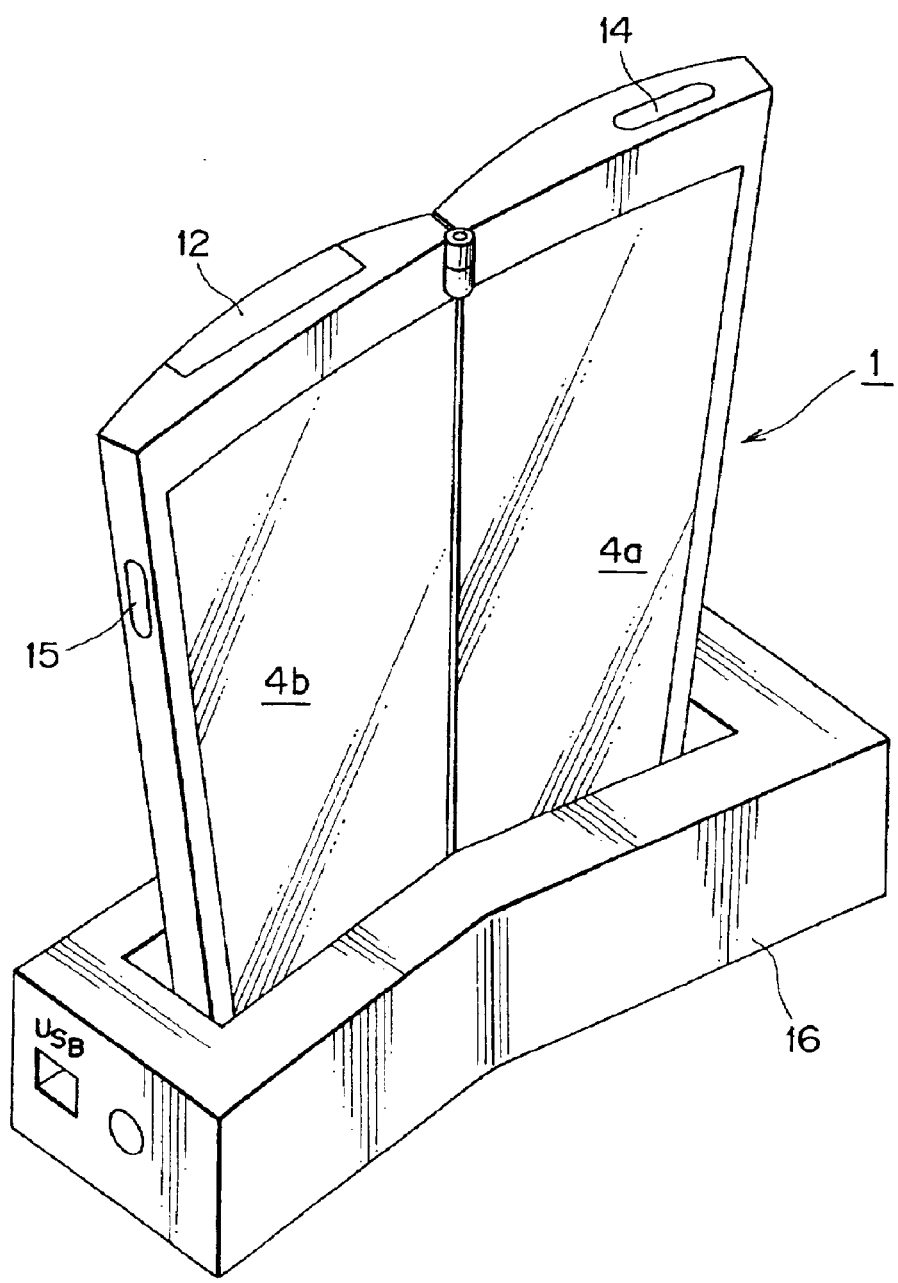
FIG. 14 is a perspective view showing the information processing apparatus of FIGS. 2A to 2D in a charging state.

Connection of the information processing apparatus 1 to a personal computer or the like to download and write contents into the contents storage 55 or to charge the information processing apparatus 1 is performed in such a manner as seen in FIG. 14. Referring to FIG. 14, a cradle 16 is connected to the personal computer or some other power supply, and the information processing apparatus 1 is loaded into the cradle 16. In this instance, the connection terminal 13 of the information processing apparatus 1 is connected to the cradle 16.

Now, a second embodiment of the present invention wherein the information processing apparatus of the present invention is applied as a portable telephone set with a camera is described.

Figure 15:
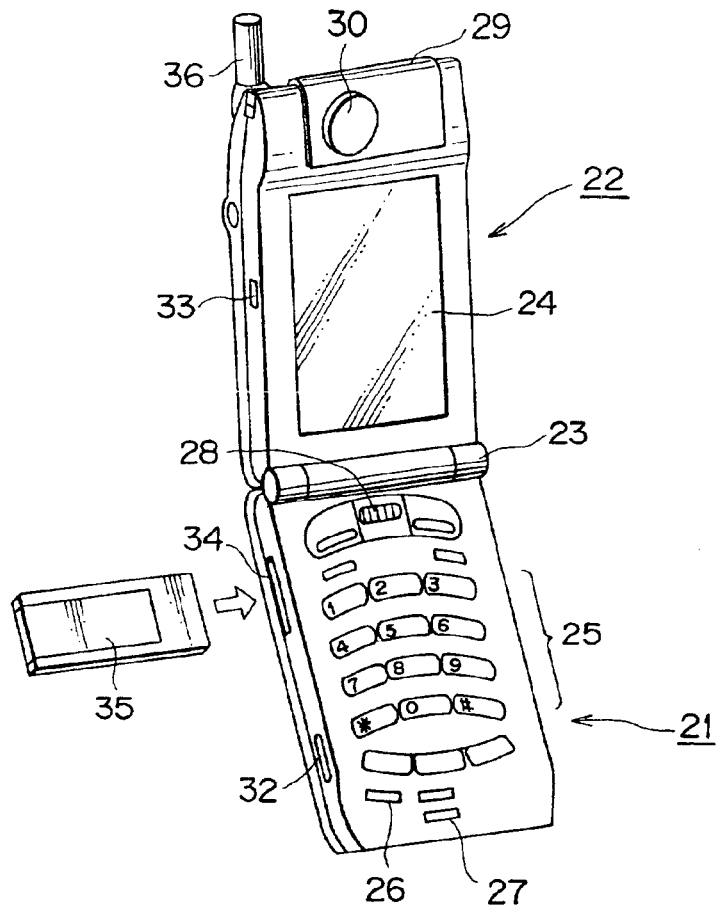
FIG. 15 is a perspective view showing another information processing apparatus to which the present invention is applied.

FIG. 15 shows the information processing apparatus of the present embodiment. Referring to FIG. 15, a body 22 is mounted for pivotal motion on another body 21 by means of a hinge 23. A display section 24 formed from a liquid crystal display unit is provided on the body 22 and can display a radio wave reception condition, a remaining amount of the battery, a registered telephone number, incoming and outgoing call histories, contents of an electronic mail, a simple homepage, a photograph or the like.

Operation keys 25 such as numeral keys from "0" to "9" a call origination key, a redial key, a clearing and power supply key, a clear key and an electronic mail key are provided on the body 21. Further, a memo button 26 for recording voice of the other party during talking and a microphone 27 for collecting voice of the user are provided on the body 21. A jog dial 28 for performing a scrolling operation of a telephone number list or an electronic mail displayed on the display section 24, a page turning operation of a simple homepage, an image feeding operation and other necessary operation is provided on the body 21 such that it projects a little from the surface of the body 21.

Figure 16:
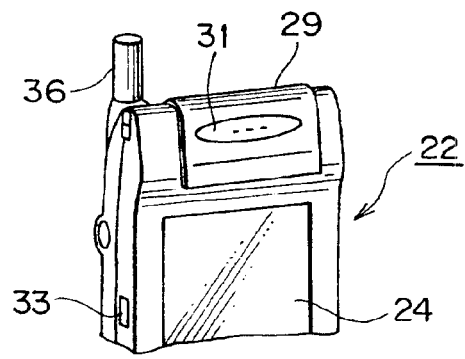
FIG. 16 is a perspective view showing part of the information processing apparatus of FIG. 16.

A camera section 29 is provided at an upper portion of the body 22. The camera section 29 is mounted for pivotal motion over a range of approximately 180 degrees. A CCD (Charge Coupled Device) camera 30 is provided on the camera section 29, and if the camera section 29 is pivoted by 180 degrees, then a speaker 31 provided on the rear face side of the camera section 29 is directed forwardly as seen in FIG. 16 such that the user can talk to the speaker 31 thereby using the information processing apparatus as a portable telephone set. An antenna 36 is mounted on the body 22.

Now, correspondence of the information processing apparatus of the second embodiment to that of the first embodiment is described. The display section 24 corresponds to the display sections 4a and 4b of the first embodiment, and a sub display unit not shown provided on the rear face side of the body 22 corresponds to the sub display section 17. A power switch 32 corresponds to the power switch 15; a function switch 33 to the function switch 14; and the jog dial 28 to the feed switch 6. The jog dial 28 has a configuration same as that of the operation dial 11 shown in FIG. 7. An SM slot 34 and a memory stick 35 correspond to the removable memory interface 12 and the memory stick, respectively, and a connection terminal and a headphone terminal not shown correspond to the connection terminal 13 and the headphone terminal 18, respectively.

Operation for displaying and reading aloud contents of a book is similar to that in the first embodiment. Therefore overlapping description of it is omitted herein to avoid redundancy.

It is to be noted that, while, in the first and second embodiments described above, a hinge need not necessarily be used as pivotal supporting means between two housings, various other elements may be used. Further, in the first embodiment, the auxiliary display section may be provided not on the body 2b but otherwise on an outer face of the body 2a.

Furthermore, while, in the first embodiment, the display sections 4a and 4b are provided in a spread fashion on the bodies 2a and 2b, respectively, where there is no problem even if only one display section is provided, the other display section may be formed otherwise as a protective cover for the display section, and reading aloud may be performed in response to opening or closing of the protective cover.

In addition, while, in the embodiments described above, audio block data prepared separately from text data are used as the data to be used for reading aloud of contents, a text to speech block may be provided additionally to successively produce audio data for reading aloud from text data.

While preferred embodiments of the present invention have been described using specific terms, such description is for illustrative purposes only, and it is to be understood that changes and variations may be made without departing from the spirit or scope of the following claims.

What is claimed is:

1. An information processing apparatus, comprising:
    a portable housing having a display section provided thereon;
    a lid mounted for opening and closing motion on said housing for covering said display section;
    opening/closing detection means for detecting whether said lid is opened or closed with respect to said housing;
    display control means for displaying text data on said display section;
    audio reproducing means for reproducing audio data relating to said text data;
    memory means for storing a memory location of said text data being displayed immediately before a closing of said lid is detected by said opening/closing detecting means; and
    control means for controlling said audio reproducing means so as to reproduce the audio data relating to said memory location of said text data stored by said memory means upon detecting that said lid has been closed.

2. The information processing apparatus according to claim 1, wherein, when said opening/closing detection means detects that said lid has been closed, supply of power to said display section is stopped.

3. The information processing apparatus according to claim 1, further comprising link data reproducing means for reproducing link data indicative of a relation between said text data and the audio data.

4. The information processing apparatus according to claim 3, wherein said memory means further stores a location of said audio data being reproduced immediately before an opening of said lid is detected by said opening/closing detection means, and
    wherein said control means further controls said display control means so that said display on said display section is started from said text data relating to audio data reproduced when said location in said memory means of said opening of said lid is detected by said opening/closing detection means.

5. The information processing apparatus according to claim 3, wherein said control means performs control to start reproducing said audio data relating to said memory location of said text data stored by said memory means based on said text data displayed immediately before the closing of said lid is detected and on said link data.

6. The information processing apparatus according to claim 4, wherein said audio reproducing means stops reproducing said audio data when said display section displays said text data relating to said location of said audio data reproduced immediately before an opening of said lid is detected.

7. The information processing apparatus according to claim 1, further comprising reproducing resumption position storage means for storing reproducing resumption position data indicative of a resumption position of reproduction of one of said text data and said audio data and, wherein, when an instruction to resume reproduction of said text data or said audio data is received, one of displaying said text data and reproducing said audio data is resumed based on said reproducing resumption position data stored in said reproducing resumption position storage means.

8. The information processing apparatus according to claim 1, further comprising connection means for connecting with an audio apparatus to be fed audio data reproduced by said audio reproducing means, and connection detection means for detecting that said audio apparatus is connected to said connection means and, wherein said audio reproducing means stops reproducing said audio data while said connection detection means does not detect connection of the audio apparatus.

9. The information processing apparatus according to claim 8, further comprising power supply control means for controlling, a power supply to said information processing apparatus, wherein said control means controls said power supply control means so that said power supply to said information processing apparatus is switched off after said reproducing of said audio data is stopped.

10. The information processing apparatus according to claim 1, further comprising audio outputting means for outputting said audio data reproduced by said audio reproducing means, connection means for connecting an external audio apparatus to which audio data reproduced by said audio reproducing means are outputted, wherein said audio data reproduced by said audio data reproducing means are outputted only to said connection means when inhibition data is reproduced by an inhibition data reproducing means.

11. The information processing apparatus according to claim 1 further comprising operation means for operation by a user to input an instruction to start reproduction of said audio data, wherein
    said control means performs control to start reproducing said audio data relating to said memory location of said text data stored by said memory means when said instruction is inputted in said state that said lid has been closed.

12. The information processing apparatus according to claim 1, wherein said display section comprises a first display section and said apparatus further comprises a second display section arranged on an exterior surface of said portable housing, wherein
    said second display section displays a title of said audio data in said state that said lid has been closed.

13. A controlling method of controlling outputting, from an information processing apparatus that includes a portable housing having a display section provided thereon and a movable lid mounted for opening and closing motion on said housing for covering said display section, text data to be displayed on said display section and audio data relating to said text data, the method comprising the steps of:

successively displaying said text data on said display section in response to an operation of a user;

detecting that said lid for said housing is moved while said text data are displayed;

searching for said audio data relating to said text data displayed on said display section immediately before closing motion of said lid is detected; and successively reproducing said audio data from said searched audio data.

14. The controlling method according to claim 13, wherein said audio data are reproduced in response to detection of movement of said lid only when said lid is closed.

15. The controlling method according to claim 13, wherein, when reproducing of said audio data is started, the displaying of said text data on said display section is stopped.

16. The controlling method according to claim 13, further comprising the steps of: before starting to reproduce said audio data, searching for reproduction inhibition information indicating reproducing of said audio data from a speaker of said information processing apparatus is inhibited, and inhibiting said reproducing of said audio data when said reproduction inhibition information is detected.

17. The controlling method according to claim 13, further comprising the steps of:

detecting movement of said lid with respect to said housing during reproducing of said audio data;

searching for said text data relating to said audio data being reproduced when a movement of said lid is detected; and displaying said text data successively beginning with said searched display data on said display section in response to an operation of a user.

* * * * *